UNITED STATES PATENT OFFICE.

CHARLES GIRARD, OF PARIS, FRANCE.

EXPLOSIVE.

No. 895,254.  Specification of Letters Patent.  Patented Aug. 4, 1908.

Application filed March 27, 1905. Serial No. 252,420.

*To all whom it may concern:*

Be it known that I, CHARLES GIRARD, a citizen of the Republic of France, and resident of Paris, France, have invented new and useful Improvements in Explosives, which improvements are fully set forth in the following specification.

It has been known for a long time that by mixing certain substances with a given melting point, a compound is obtained, having a lower melting point than that of the ingredient which melts at the highest temperature. It has been found that by mixing nitro-derivatives with each other in the proportion of their molecular weight, compounds are obtained, the melting point of which is not only lower than the melting points of the constituents, but undergoes a maximum reduction. It must be pointed out here that the preparation of these compounds can be effected without any difficulties. It is sufficient to bring together weighed quantities, proportional to the molecular weights of each of the constituents which are to form the mixture in question, to mix them in a thorough manner and to melt them on a water bath. The mass is then cast. After the cooling, it is ready for the use for which it is intended.

The results of experiments are given in the following table:

| Compounds. | Formula. | Molecular weight. | Melting point. | | Compounds. | Formula. | Molecular weight. | Melting point. | Melting point of the mixture. |
|---|---|---|---|---|---|---|---|---|---|
| Azobenzene | $(C_6H_5)_2N_2$ | 182 | 66.5° | + | Binitrobenzene | $C_6H_4(NO_2)_2$ | 168 | 85° | 40° |
| Do | Do | Do | Do | + | Binitrotoluene | $C_6H_3CH_3(NO_2)_2$ | 182 | 71° | 34.5° |
| Do | Do | Do | Do | + | Trinitrotoluene | $C_6H_2CH_3(NO_2)_3$ | 227 | 80° | 21° |
| Do | Do | Do | Do | + | Trinitroresorcin | $C_6H(OH)_2(NO_2)_3$ | 245 | 175° | 64° |
| Do | Do | Do | Do | + | Nitronaphthalene | $C_{10}H_7NO_2$ | 173 | 61° | 37° |
| Do | Do | Do | Do | + | Diamidoazobenzene | $C_6H_5NH_2C_6H_3(NH_2)_2$ | 212 | 117° | 59° |
| Do | Do | Do | Do | + | Trinitrophenol | $C_6H_2OH(NO_2)_3$ | 229 | 122° | 61° |
| Do | Do | Do | Do | + | Paranitranilin | $C_6H_4NO_2NH_2$ | 138 | 147° | 66° |
| Nitronaphthalene | $C_{10}H_7NO_2$ | 173 | 61° | + | Naphthylamin | $C_{10}H_7NH_2$ | 143 | 50° | 46° |
| Binitrotoluene | $C_6H_3CH_3(NO_2)_2$ | 182 | 71° | + | Binitrotoluene | $C_6H_3CH_3(NO_2)_2$ | 182 | 71° | 28° |
| Cresol | $C_6H_4(CH_3)OH$ | 108 | 31° | + | Binitrobenzene | $C_6H_4(NO_2)_2$ | 168 | 85° | 40° |
| Naphthylamin | $C_{10}H_7NH_2$ | 143 | 50° | + | Phenol | $C_6H_5OH$ | 94 | 40° | 7° |
| Paratoluidin | $C_6H_4CH_3NH_2$ | 107 | 45° | + | Paratoluidin | $C_6H_4CH_3NH_2$ | 107 | 45° | 13° |
| Do | Do | Do | Do | + | Azoxybenzid | $(C_6H_5)_2N_2O$ | 198 | 36° | 13.5° |
| Trinitrophenol | $C_6H_2OH(NO_2)_3$ | 229 | 122° | + | Binitrobenzene | $C_6H_4(NO_2)_2$ | 168 | 85° | 15° |
| Do | Do | Do | Do | + | Trinitrocresol | $C_6HCH_3OH(NO_2)_3$ | 243 | 107° | 70° |
| Do | Do | Do | Do | + | Mononitrophenol | $C_6H_4OHNO_2$ | 139 | 45° | 30° |
| Do | Do | Do | Do | + | Binitrobenzene | $C_6H_4(NO_2)_2$ | 168 | 85° | 56° |
| Do | Do | Do | Do | + | Binitrotoluene | $C_6H_3CH_3(NO_2)_2$ | 182 | 71° | 47° |
| Do | Do | Do | Do | + | Paranitranilin | $C_6H_4NO_2NH_2$ | 138 | 147° | 74° |
| Do | Do | Do | Do | + | Nitronaphthalene | $C_{10}H_7NO_2$ | 173 | 61° | 49° |
| Do | Do | Do | Do | + | Binitronaphthalene | $C_{10}H_6(NO_2)_2$ | 218 | 135° | 80° |

Any change made in these proportions, raises the melting point of the mixture, for instance:

| | | | | | | | | Melting point of the mixture. |
|---|---|---|---|---|---|---|---|---|
| Binitrotoluene. | Melting point 71°. | 1 molecule 182 gr. | + | Binitrobenzene. | Melting point 85°. | 1 molecule 168 gr. | | 40° |
| Do. | Do. Do | Do. Do. | + | Do. | Do. Do. | ½ Do. 84 gr. | | 47° |
| Do. | Do. Do | Do. Do. | + | Do. | Do. Do. | ¼ Do. 42 gr. | | 54° |
| Do. | Do. Do. | Do. Do. | + | Do. | Do. Do. | ⅕ Do. 33.6 gr. | | 56° |
| Do. | Do. Do. | Do. Do. | + | Do. | Do. Do. | 1/10 Do. 16.8 gr. | | 64° |

| | | | | | | | | Melting point of the mixture. |
|---|---|---|---|---|---|---|---|---|
| Binitrobenzene. | Melting point 85°. | 1 molecule 168 gr. | + | Binitrotoluene. | Melting point 71°. | 1 molecule 182 gr. | | 40° |
| Do. | Do. Do. | Do. Do. | + | Do. | Do. Do. | ½ Do. 91 gr. | | 48° |
| Do. | Do. Do. | Do. Do. | + | Do. | Do. Do. | ¼ Do. 45.5 gr. | | 54° |
| Do. | Do. Do. | Do. Do. | + | Do. | Do. Do. | ⅕ Do. 36.4 gr. | | 55° |
| Do. | Do. Do. | Do. Do. | + | Do. | Do. Do. | 1/10 Do. 18.2 gr. | | 59° |

| | | | | | | | | Melting point of the mixture. |
|---|---|---|---|---|---|---|---|---|
| Trinitrophenol. | Melting point 107°. | 1 molecule 229 gr. | + | Trinitrocresol. | Melting point 107°. | 1 molecule 243 gr. | | 70° |
| Do. | Do. Do. | Do. Do. | + | Do. | Do. Do. | ½ Do. 121.5 gr. | | 78° |
| Do. | Do. Do. | Do. Do. | + | Do. | Do. Do. | ¼ Do. 60.7 gr. | | 86° |
| Do. | Do. Do. | Do. Do. | + | Do. | Do. Do. | ⅕ Do. 48.6 gr. | | 101° |
| Do. | Do. Do. | Do. Do. | + | Do. | Do. Do. | 1/10 Do. 24.3 gr. | | 108° |

| | | | | | | | | Melting point of the mixture. |
|---|---|---|---|---|---|---|---|---|
| Trinitrocresol. | Melting point 107°. | 1 molecule 243 gr. | + | Trinitrophenol. | Melting point 122°. | 1 molecule 229 gr. | | 70° |
| Do. | Do. Do. | Do. Do. | + | Do. | Do. Do. | ½ Do. 114.5 gr. | | 80° |
| Do. | Do. Do. | Do. Do. | + | Do. | Do. Do. | ¼ Do. 57.2 gr. | | 89° |
| Do. | Do. Do. | Do. Do. | + | Do. | Do. Do. | ⅕ Do. 45.8 gr. | | 98° |
| Do. | Do. Do. | Do. Do. | + | Do. | Do. Do. | 1/10 Do. 22.9 gr. | | 101° |

By means of these components or constituents which play the part of combustibles, it is possible to produce remarkable explosives, by mixing them either with suitable oxidizing agents such as alkaline chlorates and perchlorates, alkaline and ammonium nitrates, without any addition of hydrocarbons, oils, etc. or with nitric ethers,—more particularly nitroglycerin,—the latter method producing dynamites in which the nitroglycerin does not freeze even at a very low temperature. Moreover, some of the constituents, the succinct enumeration of which has been judiciously selected, are in themselves powerful explosives, for instance, mixtures of picric and trinitrocresylic acids, the melting points of which are sufficiently low to enable them to be cast into shells and other hollow projectiles at the temperature of the water bath These types of explosives are the following:—

1. *Explosives obtained by direct mixture of an oxidizing agent or supporter of combustion with the combustible represented by the combination of two nitro-substances.*

(1) Chlorate of potash...... 72%
Azobenzene 182 gr. binitrotoluene 182 gr..... 28%

(2) Nitrate of ammonia...... 63%
Azobenzene 182 gr. binitrotoluene 182 gr..... 37%

(3) Perchlorate of ammonia. 69%
Azobenzene 182 gr. binitrotoluene 182 gr..... 31%

(4) One of the oxidizing agents above indicated 71%
Equimolecular mixture of the nitro derivatives 23%
Mixture in atomic proportions and in powder of zinc and aluminum. 6%

(5) Equimolecular mixture of trinitrocresol and picric acid........... 45%
Chlorate of potassium... 55%

Composition No. 5 containing trinitrocresol and picric acid is capable of being exploded by action of a detonator, and is peculiarly fitted without other admixture for charging projectiles, and possesses the advantage of permitting the shell to be charged without danger. This composition also possesses a power exceeding each of the nitro bodies taken singly.

In view of the lowering of the melting point, it is no longer necessary to use oil or any other substance intended to give to the combustible liquid the shape which alone enables the supporter of combustion to be completely inclosed, and by its fluidity reduces the sensitiveness of the mixture. The operation can be carried on at as low temperature as desired, by judiciously choosing the constituents.

The nitro-combination or compound is melted on the water bath in a suitable reservoir. Some oxidizing agent or supporter of combustion is added to it, such as a chlorate, perchlorate or nitrate, ground to fine powder, and incorporated until it becomes perfectly homogeneous. The product thus obtained, very plastic at the temperature at which the operation takes place, is passed through a screen No. 20 or 30 where it is reduced to grains, and on returning to the normal temperature, forms a dry powder which can be polished. To these mixtures could be added, if desired, various combustibles such as starch, sugar, metals in powder, etc. The oxidizing substance can also be soaked for a certain time, after having been molded to the most suitable dimensions, in one of the compounds hereinbefore described, maintained in the state of fusion. A very homogeneous explosive is thus obtained, which does not exude within the limits of temperature determined by the melting point of the combustible which has been used in its preparation.

The following composition could be given, by way of example:—

Chlorate of potash.......... 72%
Azobinitrotoluene (melting point 34.5° C.) ........... 28%

| | |
|---|---|
| Ammonium nitrate | 63% |
| Azobinitrotoluene | 37% |
| Perchlorate of ammonia | 69% |
| Azobinitrotoluene | 31% |
| Chlorate of potash | 79% |
| Azodiamidoazobenzene (melting point 59° C.) | 21% |
| Chlorate of potash | 65% |
| Picroazobenzene (melting point 61° C.) | 35% |
| Chlorate of potash | 76% |
| Azoparanitranilin (melting point 60° C.) | 24% |

The above proportions are calculated so as to obtain as final products oxid of carbon and water, but they could, of course, be modified so as to bring about a more or less complete combustion, according to the force that the explosive is required to have and to the conditions in which it will have to be used. In this way, a whole gamut or scale of explosives could be obtained, from the most powerful, with a high detonating temperature, to the blasting powders for mines.

2. *Explosives obtained by the addition to nitric ethers, more particularly to nitroglycerin, of combinations of nitro-substances.*

| | |
|---|---|
| Azobenzene 182 gr. azotoluene 210 gr. | 5% |
| Nitroglycerin | 95% |

It is well known that foreign substances added in small quantities to nitroglycerin, have for their result to retard, or prevent freezing. The use of certain solid nitro-derivatives or carbids of the aromatic series has been suggested even quite lately for that object.

The advantage and the novelty of the use of the combinations hereinbefore described, consist in the possibility of dissolving these combinations in nitric ether at a temperature as low as possible, whereby all danger is removed, which could not be done with the solid nitro-derivatives mentioned before, in view of the fact that the most fusible among them melts about 59° C. In this way it is possible to dissolve in nitroglycerin the combinations hereinbefore described of azobenzol and of its homologues, which would be a dangerous thing if done with azobenzene alone which melts at 66.5° C. This latter substance has the property which it shares with certain nitrates of considerably lowering the freezing temperature of nitroglycerin. Moreover, azobenzene is a neutral body which cannot cause any alteration or decomposition of nitroglycerin, which accidents are always to be feared with certain nitro-derivatives which are very often more or less acid, and finally it communicates to the dynamites containing it, a remarkable want of sensitiveness.

Proportional addition to dynamites of the new compounds hereinbefore described, increases the power of the said dynamites. It is well known, in fact, that nitroglycerin contains an excess of oxygen which is liberated at the moment of its detonation, as per following equation.

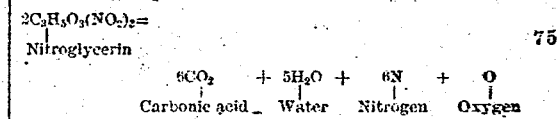

$$2C_3H_5O_3(NO_2)_3 = 6CO_2 + 5H_2O + 6N + O$$

Nitroglycerin — Carbonic acid — Water — Nitrogen — Oxygen

The free oxygen can oxidize the carbon and the hydrogen contained in the compounds added to the nitric ether, and the formation of gases resulting from this action, increases the power of the explosive.

The proportion of nitro-compounds to be added to nitro-glycerin for obtaining all these advantages, is approximately 5%.

The preparation of dynamites by means of this process consists simply in dissolving the combination in nitro-glycerin at its melting temperature, and then in effecting the gelatinization or the addition of kieselguhr in the usual manner.

All that has been said, applies to nitric ethers of the fatty series.

If it is desired to manufacture smokeless powders, nitro-cellulose or mixtures of nitro-cellulose are dissolved in a suitable solvent containing in solution the desired quantity of the combination selected.

3. *Explosives that can be used for charging hollow projectiles (shells, torpedoes etc.)*

Picric acid 229 gr. or 48.5%.
Trinitrocresol, 243 gr. or 51.5%.
Trinitrocresol 243 gr. or 51.7%.
Trinitrotoluol, 227 gr. or 48%.

Shells intended for the destruction of batteries of artillery, military works, monuments etc. are at present generally charged either with molten picric acid or molten trinitrocresol. In order to charge the shells, which must be heated, in order to avoid a too rapid crystallization, the substance intended for filling them, is brought to the temperature of its melting point in a bath of chlorid of calcium, that is to say, to the temperature of 122° C. for picric acid, and 107–108° C. for trinitrocresol.

Without wishing to maintain that the two nitro-substances can alter in the conditions in which their melting generally takes place, it is nevertheless necessary to point out that it is always advisable, from the point of view of safety, to heat the nitro-bodies or substances, whatever they be, to the lowest possible degree. With the mixture by molecular weights, the melting point is lowered to 70°

The two substances in the form of powder are thoroughly mixed and melted in a water bath. In this way the work will be always carried on below the melting point of the two compounds, that is to say, in the best possible conditions as regards safety.

Although I have specifically claimed "potassium chlorate" as the preferred form of oxidizing agent, I do not desire to be limited to this particular oxidizing agent, for it is evident that other agents such as the nitrates or perchlorates of the same and other metals, or chlorates of other metals, which are solids, or nitroglycerin, which is a liquid, may be used for the purpose.

What I claim as my invention and desire to secure by Letters Patent is:—

1. A process of making explosives consisting in incorporating a plurality of different nitro-derivatives of aromatic hydro-carbons in molecular proportions, heating the mixture to liquefy the same, and then while said resulting product is in liquid condition and at a temperature below the melting point of either of said derivatives incorporating therewith an oxidizing agent substantially as described.

2. A process of making explosives consisting in incorporating a plurality of different nitro-derivatives of aromatic hydro-carbons in molecular proportions, heating the mixture to liquefy the same, and then while said resulting product is in liquid condition and at a temperature below the melting point of either of said derivatives incorporating therewith a metallic chlorate.

3. A process of making explosives consisting in incorporating trinitrocresol and picric acid in molecular proportions, heating said mixture to liquefy the same, and then while said resulting product is in a molten condition and at a temperature below the melting point of either of said bodies incorporating an oxidizing agent substantially as described.

4. A process of making explosives consisting in incorporating trinitrocresol and picric acid in molecular proportions, heating said mixture to liquefy the same and then while said resulting product is in a molten condition and at a temperature below the melting point of either of said bodies incorporating a metallic chlorate.

5. An explosive containing picric acid and trinitrocresol in molecular proportions, and potassium chlorate.

6. An explosive containing picric acid and trinitrocresol in molecular proportions, and a metallic chlorate.

In testimony whereof I have signed this specification in the presence of two subscribing witnesses.

CHARLES GIRARD.

Witnesses:
JULES ZOUSSET,
EMILE LEDVEL.